US008446896B2

(12) United States Patent
Bedrosian

(10) Patent No.: US 8,446,896 B2
(45) Date of Patent: May 21, 2013

(54) TIME SYNCHRONIZATION USING PACKET-LAYER AND PHYSICAL-LAYER PROTOCOLS

(75) Inventor: P. Stephan Bedrosian, Andover, MA (US)

(73) Assignee: LSI Corporation, San Jose, CA (US)

( * ) Notice: Subject to any disclaimer, the term of this patent is extended or adjusted under 35 U.S.C. 154(b) by 246 days.

(21) Appl. No.: 12/965,969

(22) Filed: Dec. 13, 2010

(65) Prior Publication Data

US 2011/0261917 A1 Oct. 27, 2011

Related U.S. Application Data

(60) Provisional application No. 61/326,471, filed on Apr. 21, 2010.

(51) Int. Cl.
*H04J 3/06* (2006.01)
(52) U.S. Cl.
USPC .................... 370/350; 370/348; 370/389
(58) Field of Classification Search
USPC ............... 370/324, 350, 503, 512, 510, 252, 370/304, 348, 389; 709/203, 208
See application file for complete search history.

(56) References Cited

U.S. PATENT DOCUMENTS

| 6,633,989 | B1 * | 10/2003 | Hollins ...................... 713/400 |
| 7,990,909 | B2 * | 8/2011 | Brueckheimer ............ 370/324 |
| 8,181,057 | B2 * | 5/2012 | Nichols et al. ............. 713/401 |
| 2008/0080562 | A1 * | 4/2008 | Burch et al. ............... 370/503 |
| 2009/0222685 | A1 | 9/2009 | Foster et al. |
| 2010/0085990 | A1 | 4/2010 | Belhadj et al. |

FOREIGN PATENT DOCUMENTS

WO WO 2009/105838 9/2009

OTHER PUBLICATIONS

IEEE—1588 Precision Time Protocol: Essential to Next-Generation Test Systems, by Paul Skoog, Oct. 2007, 3 pages.

* cited by examiner

*Primary Examiner* — Brenda H Pham
(74) *Attorney, Agent, or Firm* — Mendelsohn, Drucker, & Associates, P.C.; Steve Mendelsohn

(57) ABSTRACT

In certain embodiments, a slave node in a packet network achieves time synchronization with a master node by implementing a packet-layer synchronization procedure, such as the IEEE1588 precision timing protocol (PTP), to set the slave's local time based on the master's time. The slave's local time is then maintained by implementing a physical-layer syntonization procedure, such as synchronous Ethernet, without relying on the packet-layer synchronization procedure. The packet-layer synchronization procedure may be selectively employed to adjust the slave's local time (if needed) after significant periods of time (e.g., substantially greater than one second). Both the packet-layer synchronization procedure and the physical-layer syntonization procedure are traceable to a common reference timescale (e.g., UTC). Depending on the implementation, the packet-layer synchronization procedure can be, but does not have to be, terminated when not being employed to adjust the slave's local time.

20 Claims, 5 Drawing Sheets

MTIE GENERATION IS BOUNDED

MTIE GENERATION IS UNBOUNDED

TIME SYNCHRONIZATION USING PACKET-LAYER AND PHYSICAL-LAYER PROTOCOLS

CROSS-REFERENCE TO RELATED APPLICATIONS

This application claims the benefit of the filing date of U.S. provisional application No. 61/326,471, filed on Apr. 21, 2010, the teachings of which are incorporated herein by reference in their entirety.

BACKGROUND

1. Field of the Invention

The present invention relates to packet networks and, more specifically but not exclusively, to time synchronization across packet networks.

2. Description of the Related Art

This section introduces aspects that may help facilitate a better understanding of the invention. Accordingly, the statements of this section are to be read in this light and are not to be understood as admissions about what is prior art or what is not prior art.

Time synchronization deals with the actual and precise distribution of a timescale in a network that enables nodes in the network to be synchronous. As used herein, the terms "time synchronization" and "synchronization" are assumed to be synonymous. Time synchronization of nodes across a packet network has traditionally been accomplished using a packet-layer protocol that relies on the arrival times of timestamped packets to achieve time synchronization. Unfortunately, packet-layer protocols have their limitations and costs.

There has been recent work on schemes that combine a packet-layer protocol with a physical-layer protocol to achieve time synchronization. Physical-layer protocols rely on the existence of bit transitions to achieve syntonization (i.e., coordinating frequency between different nodes). Such schemes involve continuous implementation of both the packet-layer protocol and the physical-layer protocol, with the packet-layer protocol updating the time based on sync messages that arrive at least once every second, and the physical-layer protocol continuously updating frequency based on bit transitions.

SUMMARY

In one embodiment, problems in the prior art are addressed in accordance with the principles of the present invention by a selective synchronization scheme that relies on a packet-layer protocol between a master node and a slave node to set the slave's local time based on the master's time. After the slave's local time is set, a physical-layer protocol is employed to maintain the slave's local time. The packet-layer protocol may be selectively employed to update the slave's local time, if needed. For example, the packet-layer protocol can be selectively employed after detecting the existence of preferred network conditions, such as low network load. In such a selective synchronization scheme, the packet-layer protocol and the physical-layer protocol are both traceable to a common reference timescale.

In one embodiment, the present invention is a method of coordinating and maintaining timing between a master node and a slave node in a packet network. The slave node employs a packet-layer synchronization protocol during a first period, to correlate slave time at the slave node to master time at the master node. The slave node employs a physical-layer syntonization protocol during a second period, following the first period, to maintain the slave time, wherein the slave node does not use the packet-layer synchronization protocol during the second period to maintain the slave time.

In another embodiment, the present invention is a slave node that implements the aforementioned method. In yet another embodiment, the present invention is a packet network having such a slave node and a master node.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

IEEE1588 Mode

Figure 1:
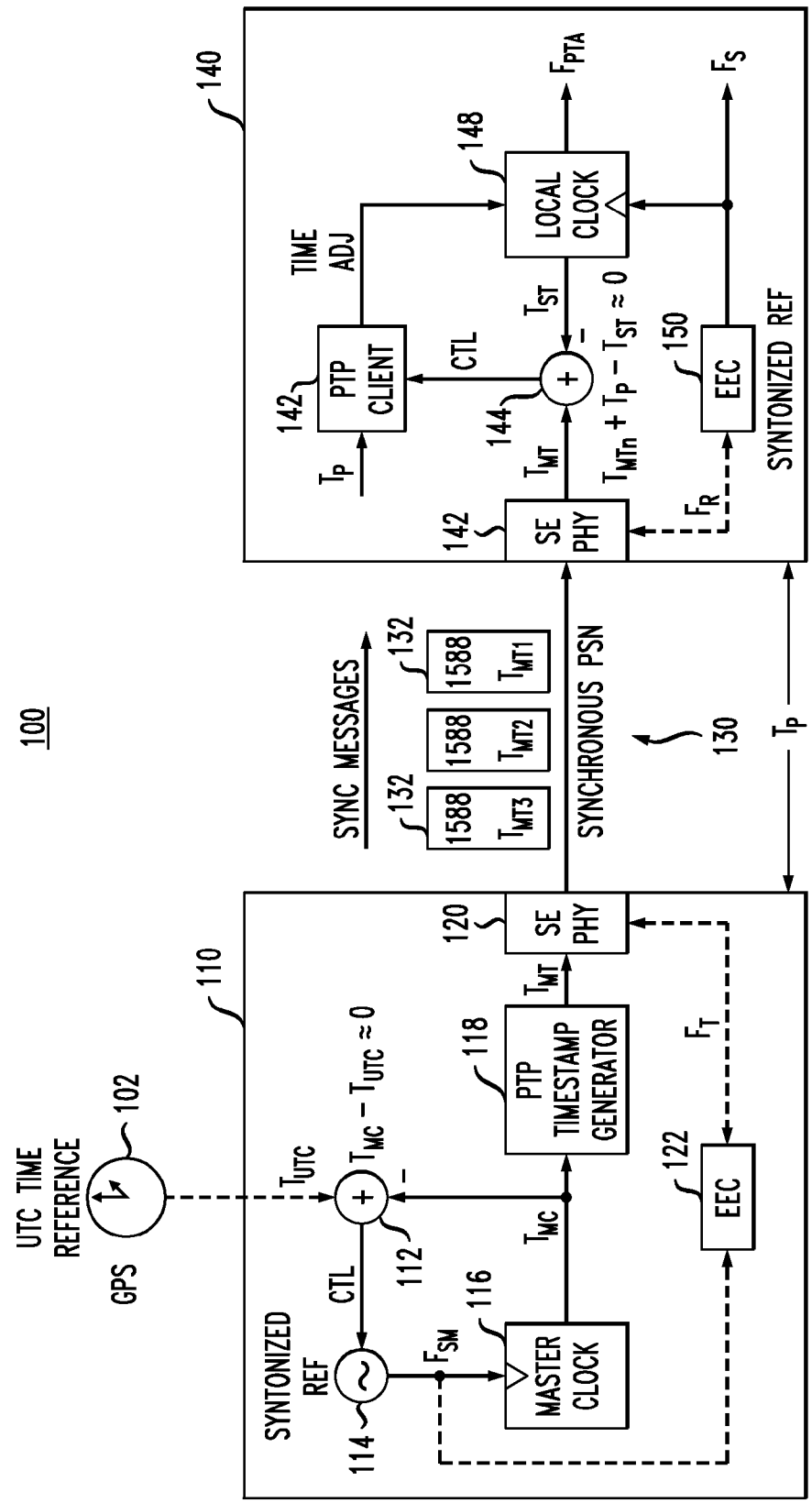
FIG. 1 shows a block diagram of a timing system according to certain embodiments of the selective synchronization mode of the present invention.

The IEEE1588-2008 standard ("IEEE Standard for a Precision Clock Synchronization Protocol for Networked Measurement and Control Systems") has been proposed as a method for both synchronizing and syntonizing wireless base stations over packet-based networks. In the case of time division duplex (TDD) node B systems, time synchronization has been proposed as a way to achieve an operational phase-alignment tolerance of $\pm 1.25\,\mu s$ relative to UTC (Coordinated Universal Time) as required by the application. For this case, the IEEE1588 Precision Timing Protocol (PTP) is optioned in the two-way mode of operation, where the total propagation delay between the PTP master and the PTP slave can be measured and used to compensate received timestamps.

Although the IEEE1588 standard is a very well-documented protocol, performance aspects relating to its use or its ability to perform deterministically in real-world packet networks are not part of the standard. Due to the nature of best-effort packet networks, network packet delay variation (PDV) is a significant factor that limits the performance of IEEE1588-based systems. Changes in delay asymmetry, common in heavily loaded packet networks, also can cause time offsets that can be problematic to some end-user services requiring absolute time. In addition, due to the lack of metrics and masks to limit PDV at packet interfaces, it might not be possible to specify or enforce packet-delay behavior that is favorable to adaptive clock recovery (ACR) systems.

Another factor common to IEEE1588 systems is the long convergence time that is typically required by systems to achieve frequency and time lock. IEEE1588 sync messages are typically sent at a rate between 1 Hz to tens of Hz to a synchronizing slave. Each sync message represents a "significant instant" that a timing-recovery process can use to achieve frequency and phase lock to an IEEE1588 synchronizing master. Due to the relatively low rate of "significant instants," several minutes (or longer) might be required to achieve stable operation and phase lock to the synchronizing master. This situation is in contrast to common time-division multiplexed (TDM) synchronizing signals that exchange significant instants at a much faster rate (e.g., 1.544 MHz, 2.048 MHz, or N×51.84 MHz).

IEEE1588+Synchronous Ethernet Mode

One method that has been proposed to decrease the convergence time of IEEE1588-based timing-recovery systems is to use the physical layer to determine traceable frequency-based information in addition to sending IEEE1588 sync messages. Physical-layer syntonization methods, such as synchronous Ethernet (ITU-T G.8262 "Timing Characteristics of Synchronous Ethernet Equipment Slave Clock (EEC)), allow the IEEE1588 slave clock to achieve syntonization in a matter of seconds due to the high rate of significant instants. The syntonized clock, which is synchronized to the time of the master, can then be used as a stable frequency reference for the slave's local time-base. For time applications, the synchronization process also requires that the one-way delay be computed to determine the exact time at the IEEE1588 slave clock. The one-way delay can be computed in a number of ways including the exchange of two-way PTP messages or by reading the correction field in PTP event messages.

Due to the maturity and standardization of synchronous Ethernet (ITU-T G.8264 "Packet over Transport Aspects— Quality and Availability Targets"), synchronous Ethernet has been proposed as a syntonization reference for IEEE1588-2008 in a mode called IEEE1588+synchronous Ethernet. Specific information to support this mode, including a corresponding PTP profile, is currently under development in ITU-T Question 13/15. In the IEEE1588+synchronous Ethernet mode, both the packet-layer IEEE1588 PTP synchronization protocol and the physical-layer synchronous Ethernet syntonization protocol are continuously executed to set and maintain the slave's local clock based on the master clock in the master node.

Selective Synchronization Mode

According to certain embodiments of the present invention, referred to herein as the selective synchronization mode, a packet-layer synchronization protocol (e.g., IEEE1588 PTP) is used to set the slave's local clock. The packet-layer synchronization protocol is then terminated, and the slave's local clock counting rate is maintained using a physical-layer syntonization protocol (e.g., synchronous Ethernet, SONET/SDH, or PDH). Subsequently, the packet-layer synchronization protocol can be selectively implemented to update the value of time at the slave's local clock, if needed. The packet-layer sync messages and the physical-layer syntonization signals are traceable to the same common reference timescale (e.g., UTC).

As used in this specification, the term "common reference timescale" refers to a common timescale, where parts of the system sharing a common reference timescale use the same timescale. Examples of timescales include (without limitation) UTC, Network Time Protocol (NTP), and Global Positioning System (GPS). Depending on the particular implementation, the common reference timescale may be, but does not have to be, a common physical reference.

The selective synchronization mode can be used to dramatically improve the quality of time-based systems that rely on a physical-layer syntonization source in addition to PTP. Based on the standardized PTP protocol and common network frequency distribution techniques, a PTP-based selective synchronization mode of operation according to one embodiment of the present invention can distribute time over packet-based facilities with little or no impact by network packet delay variation (PDV). In essence, the timing performance at a slave clock is directly related to the traceability, accuracy, and stability of physical-layer packet-based systems (e.g., synchronous Ethernet) or existing syntonization-based networks (e.g., SONET/SDH, DS1, or E1).

FIG. 1 shows a block diagram of a timing system 100 according to certain embodiments of the selective synchronization mode of the present invention. Timing system 100 includes PTP master node 110 and PTP slave node 140, which are interconnected via a synchronous packet-switched network (PSN) 130. PTP master 110, whose timing is based on the Global Positioning System (GPS)-based distribution of the UTC timescale 102, transmits timestamped sync messages AK via synchronous PSN 130 to PTP slave 140, which processes those sync messages using both the IEEE1588 PTP synchronization protocol and the synchronous Ethernet syntonization protocol to achieve and maintain time synchronization with master 110. In alternative embodiments, time references other than UTC may be used, such as (without limitation) Galileo time and International Atomic Time (TAI).

Within master 110, control signal generator 112 generates control signal CTL based on the difference between the UTC time $T_{UTC}$ and a master clock time $T_{MC}$ generated by master clock 116. Syntonized reference 114 generates syntonized reference frequency $F_{SM}$ based on the magnitude and sign of control signal CTL. Syntonized reference 114 could be a voltage-controlled oscillator (VCO) that adjusts its frequency such that the count value of master clock 116 equals UTC time. Master clock 116 generates the master clock time $T_{MC}$ based on the syntonized reference frequency $F_{SM}$. In particular, the syntonized reference frequency $F_{SM}$ is used to control the counting rate of master clock 116. PTP timestamp generator 118 uses master clock time $T_{MC}$ to generate the timestamps $T_{MTi}$ as "snapshots" of the master clock time $T_{MC}$ at specific intervals, where the timestamps $T_{MTi}$ are inserted into sync messages 132 transmitted via synchronous Ethernet physical (SE PHY) interface 120 via PSN 130 to slave 140.

In addition, Ethernet equipment clock (EEC) 122 in master 110 performs the syntonization function with EEC 150 in slave 140. In particular, EEC 122 uses the syntonized reference frequency $F_{SM}$ as a source clock to generate the transmit clock frequency $F_T$ for SE PHY 120. In addition to frequency, EEC 122 also generates Ethernet synchronization messaging channel (ESMC) packets (not shown in FIG. 1) used to denote physical-layer traceability of the transmit clock.

Note that control signal generator 112, syntonized reference 114, and master clock 116 form a time-locked loop (TLL) that receives a reference time input (i.e., $T_{UTC}$) and generates a time-locked output frequency (i.e., $F_{SM}$), where control signal generator 112 is designed to generate values for control signal CTL that adjust the frequency $F_{SM}$ of syntonized reference 114 to drive master clock time $T_{MC}$ to be equal to the UTC reference time $T_{UTC}$.

In slave 140, SE PHY 142 recovers the receive clock frequency $F_R$ from the PSN physical layer and sends it to EEC 150, which also receives the ESMC messages (not shown) and uses them as a basis to select the appropriate input PHY frequency. EEC 150 performs a phase filtering of the $F_R$ clock phase and generates the syntonized reference frequency $F_S$ for use in establishing the counting rate used to generate slave clock time $T_{ST}$ by local clock 148 and other node functions requiring a traceable frequency reference. Control signal generator 144, PTP client 146, and local clock 148 form a time-controlled loop (TCL) in slave 140, where control signal generator 144 generates values for control signal CTL that cause PTP client 146 to adjust the time of local clock 148 to drive the slave clock time $T_{ST}$ to match the master timestamps $T_{MTi}$ extracted by SE PHY 142 from incoming sync messages 132 plus the master-to-slave propagation time T. Due to a number of factors related to the PTP operating mode and packet transport over PSN 130, PTP client 146 may also need to perform one-way delay-time measurement and compensation and PDV filtering.

PTP and Synchronous Ethernet Traceability

Figure 2:
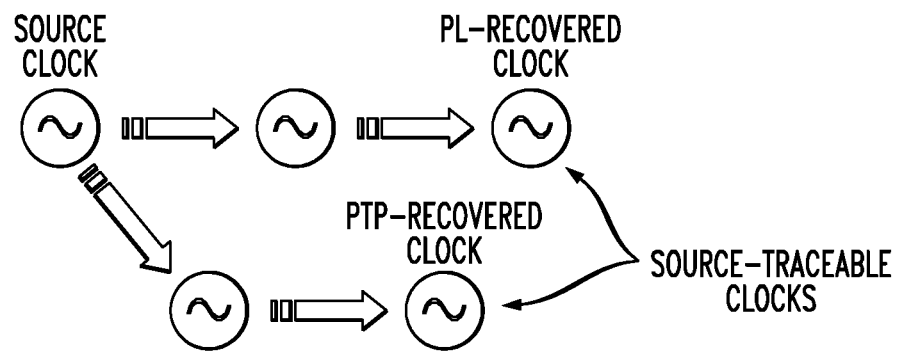
FIG. 2 shows how a source-traceable relationship tends to keep the maximum time interval error (MTIE) generation between two clocks bounded.

In system 100 of FIG. 1, the physical-layer (PL)-based EEC clock and the IEEE1588 PTP-based clock are source traceable to the same time reference (i.e., UTC time). FIG. 2 shows how a source-traceable relationship tends to keep the maximum time interval error (MTIE) generation between these two clocks bounded. For time-based systems, this situation means that the time error is bounded between the two clocks. For example, a 1 pulse per second (pps) timing signal that is generated by a source-traceable PL-based clock and a PTP-based clock always has a bounded time/phase error relationship.

Figure 3:
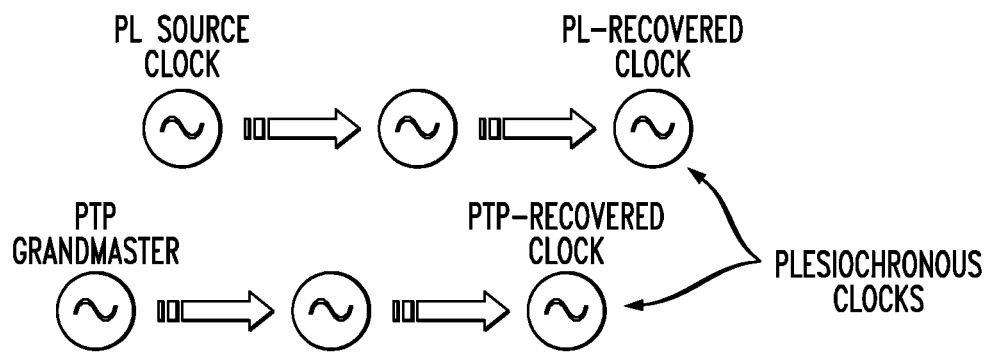
FIG. 3 shows how a plesiochronous relationship fails to keep the MTIE generation between two clocks bounded.

The source-traceable relationship is in contrast to the plesiochronous relationship shown in FIG. 3. In this case, the timing chains for the PL-based and PTP-based clocks originate from two different source clocks. For example, the physical-layer clock could be traceable to a PRS reference (ITU-T G.811 "Timing Characteristics of Primary Reference Clocks"), and the PTP master clock could be traceable to UTC time. In this case, MTIE could be generated at a maximum rate of 0.01 ns/sec (e.g., 0.01-ppb FFO). As long as a frequency offset exists between the PL-based source clock and the PTP master clock, MTIE or time error is generated and will be unbounded. Therefore, a plesiochronous timing relationship is not preferred for end-user applications requiring absolute time.

As described previously, an IEEE1588+synchronous Ethernet system that combines a packet-layer IEEE1588 PTP protocol with a physical-layer synchronous Ethernet protocol keeps both of these protocols active indefinitely. This means that a frequency is continuously recovered from the synchronous Ethernet physical layer and is used to establish the frequency reference for the slave's local clock. In addition, IEEE1588 sync messages are continuously sent at a rate defined by the PTP profile (i.e., at least one sync message per second) and required by the PTP slave to support synchronization of its local clock. For time applications, PTP messages supporting a two-way mode of operation may also need to be sent at defined intervals (i.e., again at least one PTP message per second) to measure the one-way delay between the PTP master and the slave. Although this arrangement has been shown to work in some networks, the overall accuracy and stability of the clock recovered at the PTP slave is dependent on the operation of the interconnecting packet switches and background traffic conditions.

Packet-delay variation (PDV) has been shown to adversely affect the performance of adaptive clock recovery (ACR) systems, which includes IEEE1588 systems. Because the magnitude and frequency aspects of PDV are unspecified and unlimited, the IEEE1588 slave clock relies on a statistical analysis of a sufficient sample of received packet delays to determine the phase and time alignment of the master clock. As more PTP slaves are added to the master's domain, more PTP-related traffic is generated, which adds to the PDV problem. This problem is also compounded as packet networks grow and the background traffic increases. Any background traffic that competes with PTP-related traffic for resources in an intermediate packet switch will create PDV that can adversely affect the timing performance of PTP systems or other applications that rely on ACR methods.

Though transparent clocks (TCs) can be used to reduce the effects of PDV at the PTP slave, they must be placed at each packet switch between the master and the slave. There is also the issue of an IEEE 802.1 Open Systems Interconnection (OSI)-layer violation involved with the modification of the correction field without updating the Media Access Control (MAC) source address as well as other issues related to security of the PTP packets. See, e.g., A. Treytl, B. Hirschler, "Security Flaws and Workarounds for IEEE1588 (Transparent) Clocks," the teachings of which are incorporated herein by reference in their entirety.

Selective Synchronization Mode Time-Setting and Time-Renewal Sessions

The fundamental function of a PTP slave is to use the same epoch, epoch offset, and counting rate as the master. If these conditions are met, then the PTP slave is synchronized to the master. In other words, the time at the slave is the same and progresses at the same rate as the time at the master. In a selective synchronization system, such as system 100 of FIG. 1, the counting rate is established by the syntonized timing source carried by the synchronous Ethernet physical layer. In system 100, the synchronous Ethernet timing source is source traceable to the source of master clock 116 (i.e., UTC). In this way, the MTIE between the synchronous Ethernet clock and the master clock is bounded. The master epoch and epoch offset are sent by the exchange of PTP event messages to the PTP slave. The accuracy and convergence time of establishing the epoch and epoch offset are influenced by the rate of exchanged PTP event messages and network PDV characteristics.

To minimize the effects of network PDV and to decrease the convergence time of a PTP slave, in certain embodiments of the selective synchronization mode of the present invention, synchronous Ethernet or some other UTC-traceable physical-layer syntonized source is used as a reference by the slave's local clock. The slave is then allowed to establish a PTP session with the master to achieve a time/phase lock with the master. After synchronization has been established by the slave's local clock, PTP event messages cease to be exchanged for an extended interval (and potentially indefinitely), and the slave's local clock continues to maintain it's timescale by using the traceable syntonized reference provided by the slave's Ethernet equipment clock (EEC).

The selective synchronization mode may be said to have an initial time-setting session during which the slave initially establishes time synchronization with the master (e.g., using the PTP protocol) followed by one or more time-renewal sessions during which the results from the previous time synchronization are adjusted (if necessary) (e.g., again using the PTP protocol), where the time-setting session and the first time-renewal session as well as each successive pair of time-renewal sessions are separated by syntonization-only periods during which the slave's local clock keeps time using only the traceable syntonized reference.

Figure 4:
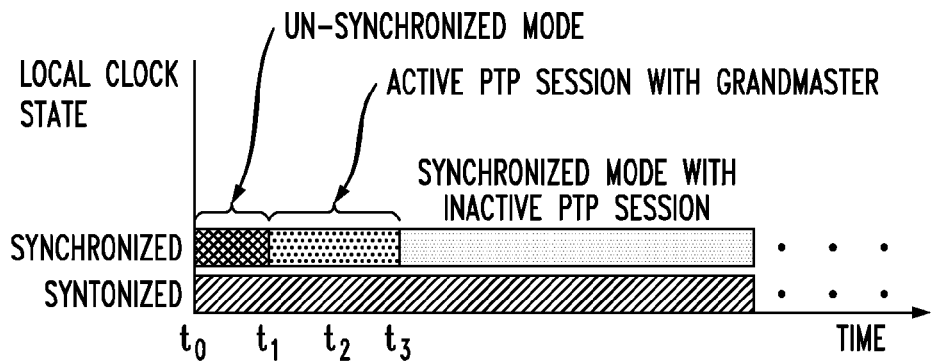
FIG. 4 shows the series of events that occur during the time-setting session of the selective synchronization mode.

FIG. 4 shows the series of events that occur during the time-setting session of the selective synchronization mode. At time t0, the slave's local clock becomes syntonized by using a physical-layer frequency reference that is traceable to the master reference. Note that, between time t0 and time t1, the slave's local clock is in an "un-synchronized mode," where the time value of the local clock is not traceable to the master. At time t1, the slave clock starts an active PTP session with the master where PTP event messages are exchanged. At time t2, the slave's local clock achieves synchronized operation with the master, where it is determined that the slave time is equal to the master time. The determination of synchronous operation can be accomplished by a number of methods, but will generally involve a point when significant changes to the local clock time are not necessary. Synchronized operation involves the computation of the one-way delay ($T_P$ in FIG. 1), which is used to correct the time of the local clock in the slave. This computation can be accomplished through the use of either a two-way mode of operation (e.g., delay request-response or P-delay mechanism) or by using the time value of the correction field if a network of transparent clocks is used. At time t3, the active PTP session with the master is terminated. By terminating the PTP session, the slave ceases to update the local clock using PTP event messages. After time t3 (i.e., a syntonization-only period), the slave's local clock remains synchronized to the master by using the synchronous Ethernet syntonized reference to maintain the counting rate and to match the progression of time at the master.

Theoretically, as long as the synchronous Ethernet clock remains source-traceable to the master clock, no long-term time error will exist between the master and the slave. Practically, however, it might be necessary or desirable for the slave to perform a time-renewal session of the selective synchronization mode to periodically re-establish an active PTP session with the master to verify it's time accuracy. For this case, the slave would renew the PTP procedure with the master. This process involves the slave computing the one-way delay time, adding this value to the received sync message timestamps, and then comparing this value with the slave's local time. If it is determined that the time difference between the master and the slave exceeds a time accuracy threshold, then a time correction of the slave's local clock could be made. This time-renewal session could be a periodic or scheduled event implemented after a syntonization-only period, for example, on the order of several hours or days. Alternatively or in addition, the time-renewal session could be implemented after detecting the existence of desired network conditions, such as during periods of low background traffic loading and low network PDV.

Figure 5:
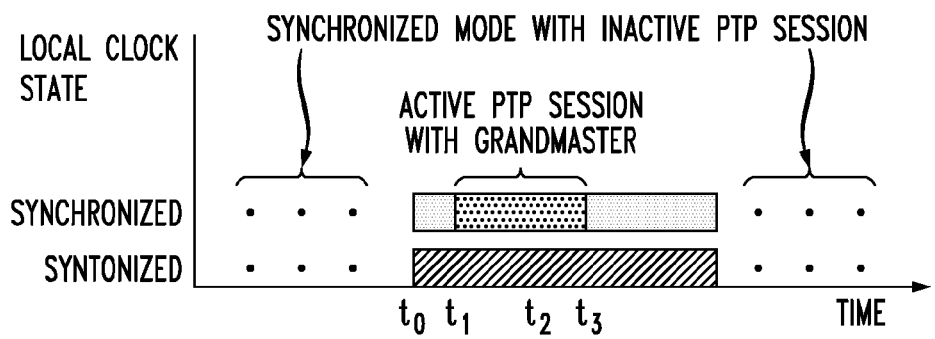
FIG. 5 shows the series of events that occur during the time-renewal session of the selective synchronization mode.

FIG. 5 shows the series of events that occur during the time-renewal session of the selective synchronization mode. At time prior to t0, the slave clock is in a synchronized mode of operation with an inactive PTP session (i.e., a syntonization-only period). For this case, it is assumed that the time-setting session of the selective synchronization mode shown in FIG. 4 has already occurred. During the syntonization-only period, the slave's local clock remains synchronized to the master clock by using the traceable synchronous Ethernet syntonization reference to maintain the counting rate and match the progression of time at the master. At time t1, the slave clock begins the time-renewal session by establishing an active PTP session with the master. This involves the use of PTP general messages to begin the exchange of PTP event messages. At time t2, the slave assesses the state of the network traffic load by performing an optional series of one-way delay measurements. If the analysis of these measurements exceeds a user-defined threshold (indicating that network conditions are not favorable), then the time-renewal session will cease, and the slave will resume the syntonization-only period using the syntonized physical layer to maintain time. Otherwise, the synchronization of the slave's local clock is verified and adjusted by using event messages, if necessary, to align with the master clock. This process can be accomplished, for example, by comparing the time value of received PTP sync messages plus the optional one-way delay measurements with the time value of the local clock. If it is determined that the time difference exceeds the defined clock accuracy, then the time of the local clock can be adjusted or synchronized to master clock. Otherwise, the time at the slave's local clock will remain unchanged. At time t3, the active PTP session with the master is terminated. By terminating the PTP session, the slave ceases to update the local clock using PTP event messages. After time t3 (i.e., another syntonization-only period), the slave's local clock remains synchronized to the master clock by using the synchronous Ethernet syntonized reference to maintain the counting rate and to match the progression of time at the master.

Between time-renewal sessions, slaves may exchange general messages with the grandmaster or boundary clock. In this way, slaves can monitor the health of a master or schedule a time-renewal event. In addition, PTP protection switching, using the Best Master Clock Algorithm (BMCA) or other alternative methods of master selection, can be performed by the slave without the need for exchanging PTP event messages between time-renewal sessions. This means that a time-renewal session can be performed with a master different from the master that was used for the original time-setting session and/or for a previous time-renewal session, as long as both master's share the same reference time (e.g., UTC). At any given time, the active master is referred to as the grandmaster.

Figure 6:
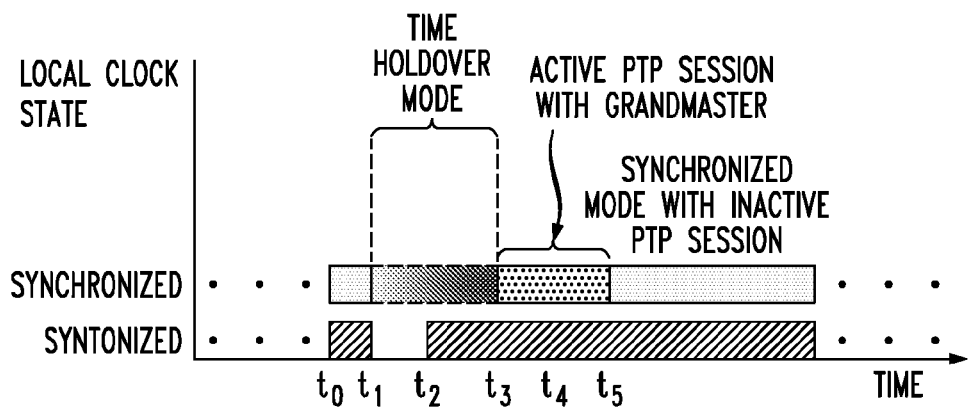
FIG. 6 shows the series of events that occur for the selective synchronization mode during a loss and recovery of the physical-layer syntonizing reference.

FIG. 6 shows the series of events that occur for the selective synchronization mode during a loss and recovery of the physical-layer syntonizing reference. At time t0, the local clock is in a synchronized state and relies on the syntonized source to maintain time accuracy with the master clock (i.e., a syntonization-only period). At time t1, the slave experiences a loss of traceability of the syntonized reference. At this time, the local clock enters a "time-holdover" phase of the selective synchronization mode, where the counting rate of the local clock is based on an atomic frequency reference (e.g., PLL in a holdover state). See P. S. Bedrosian, 2007 ITU-T WD70, "Holdover Mode for Time Distribution Systems," the teachings of which are incorporated herein by reference in their entirety. If synchronous Ethernet is used, then the EEC will maintain a frequency-based holdover state until an acceptable input reference is made available or the failed reference is restored.

The time-holdover phase will result in a degraded level of time performance of the slave's local clock. Generally, the longer a slave is in time-holdover, the greater the time uncertainty or error of the slave's local clock time. For TDD wireless applications, time uncertainty may cause the slave's time to exceed the ±1.25 μs phase alignment requirement relative to UTC. Therefore, the suitability of the time at the slave during the time-holdover phase may be in question for some wireless applications.

At time t2, the syntonized reference is restored such that the slave's syntonized reference is once again traceable to the master. At this point, the counting rate of the slave's local clock is equal to the counting rate at the master, and the time-holdover phase is exited. However, due to the time uncertainty or drift during the time-holdover interval, a time-offset error may exist between the slave and the master. At time t3, the slave initiates an active PTP session with the master by exchanging general and event messages and starts the process of holdover recovery. During this time, the time-offset error is measured, and the process of "adjusting" the time at the slave's local clock to be synchronized to the master begins. This process can be accomplished in a number of ways including gradually adjusting the local clock time until the local clock is again synchronized with the master. At time t4, the local clock achieves synchronized operation with the master and exits the time-holdover recovery process. At time t5, the active PTP session with the master is terminated, and the slave ceases to update the local clock using PTP event messages. After time t5 (i.e., another syntonization-only period), the slave's local clock remains synchronized to the master clock by using the syntonized reference to maintain the counting rate, thereby matching the progression of time at the master.

During the initial time-setting session and each subsequent time-renewal session, multiple PTP sync messages and possibly other PTP event messages are transmitted from the master to the slave at a rate of at least one message per second or according to the default or range specified by the corresponding PTP profile. During the syntonization-only periods that separate the time-setting and time-renewal sessions, PTP sync messages and other PTP event messages may be optionally transmitted from the master to the slave, because the PTP slave does not use them to update or maintain the local clock's timescale. Since the time-setting and time-renewal sessions are separated by time periods significantly longer than one second (e.g., several minutes, hours, or even days), the selective synchronization mode may be characterized by periods (i.e., the time-setting and time-renewal sessions) in which PTP messages are used to synchronize or maintain the timescale of the slave's local clock separated by relatively long periods (i.e., the syntonization-only periods lasting several minutes, hours, or even days) during which the slave's local clock does not use PTP messages to maintain the time scale of the local clock.

Selective Synchronization—Use Cases

This section covers a variety of use case scenarios that demonstrate how the PTP selective synchronization mode can be used to transport time over a packet-switched network. In addition, various methods and techniques are presented for using the PTP selective synchronization mode to achieve deterministic time synchronization over PTP-aware and non-PTP-aware packet networks.

Scheduled Time-Renewal Sessions

Unlike the current method of PTP synchronization where a PTP slave must continually recover timing over a variety of changing network-delay conditions, PTP selective synchronization mode allows PTP slaves to be re-synchronized during periods of low network PDV when the delay floor is optimum. It is a well-known fact that network PDV levels are similar to diurnal wander. This situation is typically attributed to lower traffic loads during certain times of the day or night and results in lower levels of PDV with well-defined delay floors. Thus, it is possible to schedule time-renewal sessions for PTP slaves during periods when network PDV is low. Therefore, a network operator could take advantage of these diurnal traffic patterns and schedule PTP time-renewal sessions during periods of very low network traffic.

Manual Initiation of Time-Renewal Sessions

For this method, a network operator could initiate a PTP time-renewal session at will. For example, given a unique path between a master and a PTP slave, it is possible for a network operator to purposely reduce or offload all background traffic to a different path during the PTP time-renewal session. During this time, the PTP traffic between the master and the slave would experience very low PDV in both the forward and reverse PTP paths. This alternative routing condition would last for the duration of the time-renewal session and allow the background traffic to revert to the original routing at its conclusion. A further benefit of this scheme is that the path between the master and the slave could be made "secure" by limiting other background traffic, thus reducing the likelihood of a cyber attack.

Active Load Measurement Initiation of Time-Renewal Sessions

One of the most-significant challenges facing time transfer over ordinary packet networks is the ability to accurately compensate for the propagation delay between the master and the slave clock in a network of non-PTP-aware packet switches. Due to the relationship between background traffic and the resulting traffic delay, it is not possible to accurately predict the delay that a PTP sync message will experience. This problem is further compounded by the delays caused by reverse packet traffic at intermediate switches.

Figure 7:
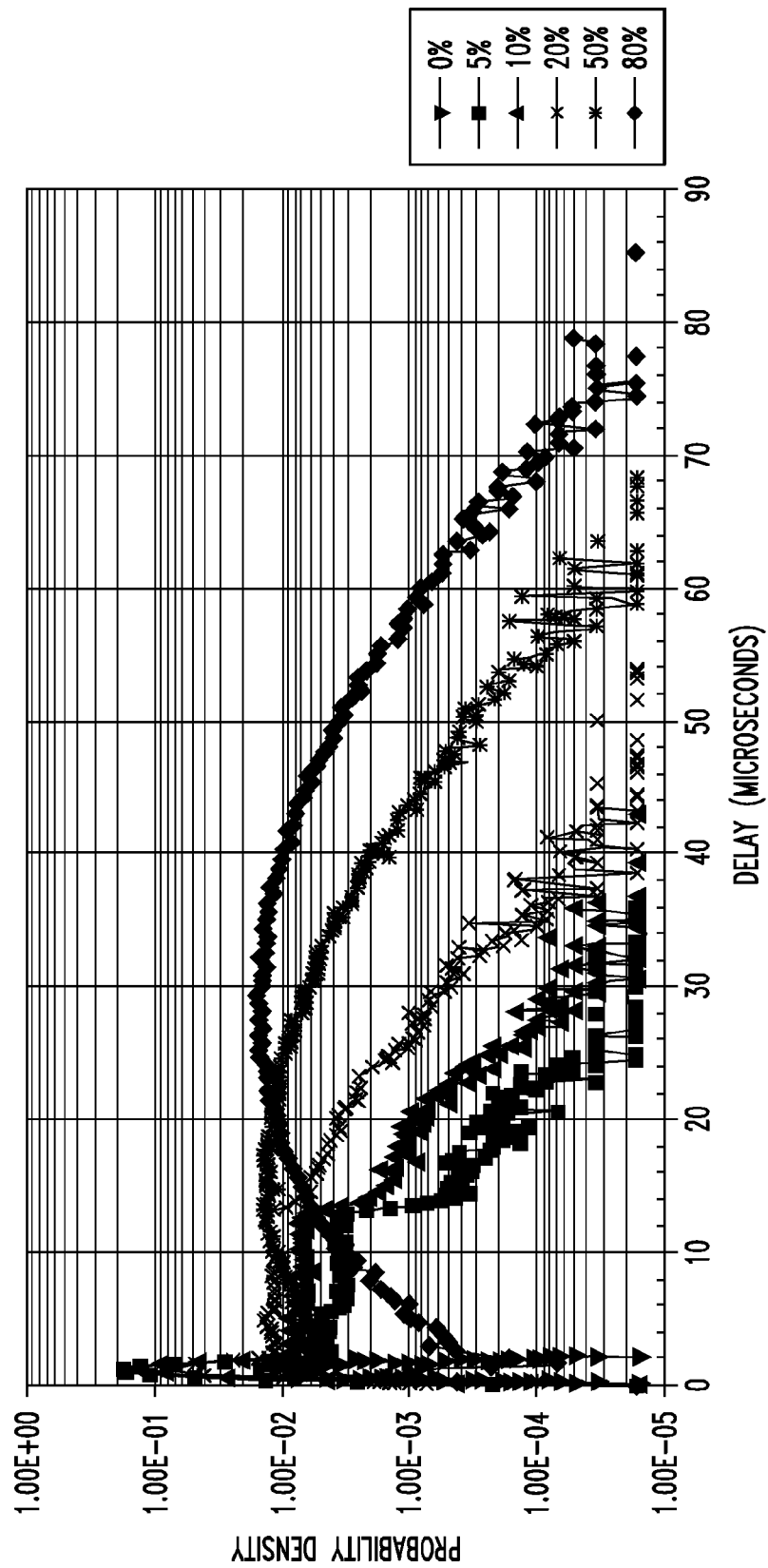
FIG. 7 shows how packet-delay variation changes as a function of background traffic load.

The plot in FIG. 7 shows how the packet-delay variation changes as a function of background traffic load. These graduated series of delay curves are based on a simulated ITU-T G.8261 ten-switch network using TM-2 background traffic loads. Each plot represents the range of packet delays experienced by a periodic series of test packets. This plot shows clearly how the PDV changes from a narrow Gaussian to a long-tailed distribution as the background traffic load changes from 0% to 80%.

In many adaptive timing-recovery systems, it is desirable to use packets with the lowest propagation delay as the basis for establishing the frequency and phase of the recovered slave clock. The packets with the lowest propagation delay for a specific path define the delay floor. Statistical filters are typically used to find those packet delays at or near the delay floor and use them in the slave clock timing-recovery process. The probability of receiving a packet delay at or near the delay floor is inversely proportional to background traffic load over the same path. In order to determine the accurate location of the delay floor, a statistically significant number of packet delays must be received. Thus, the convergence time of the slave clock's recovery process will tend to increase with increasing background traffic load.

Figure 8:
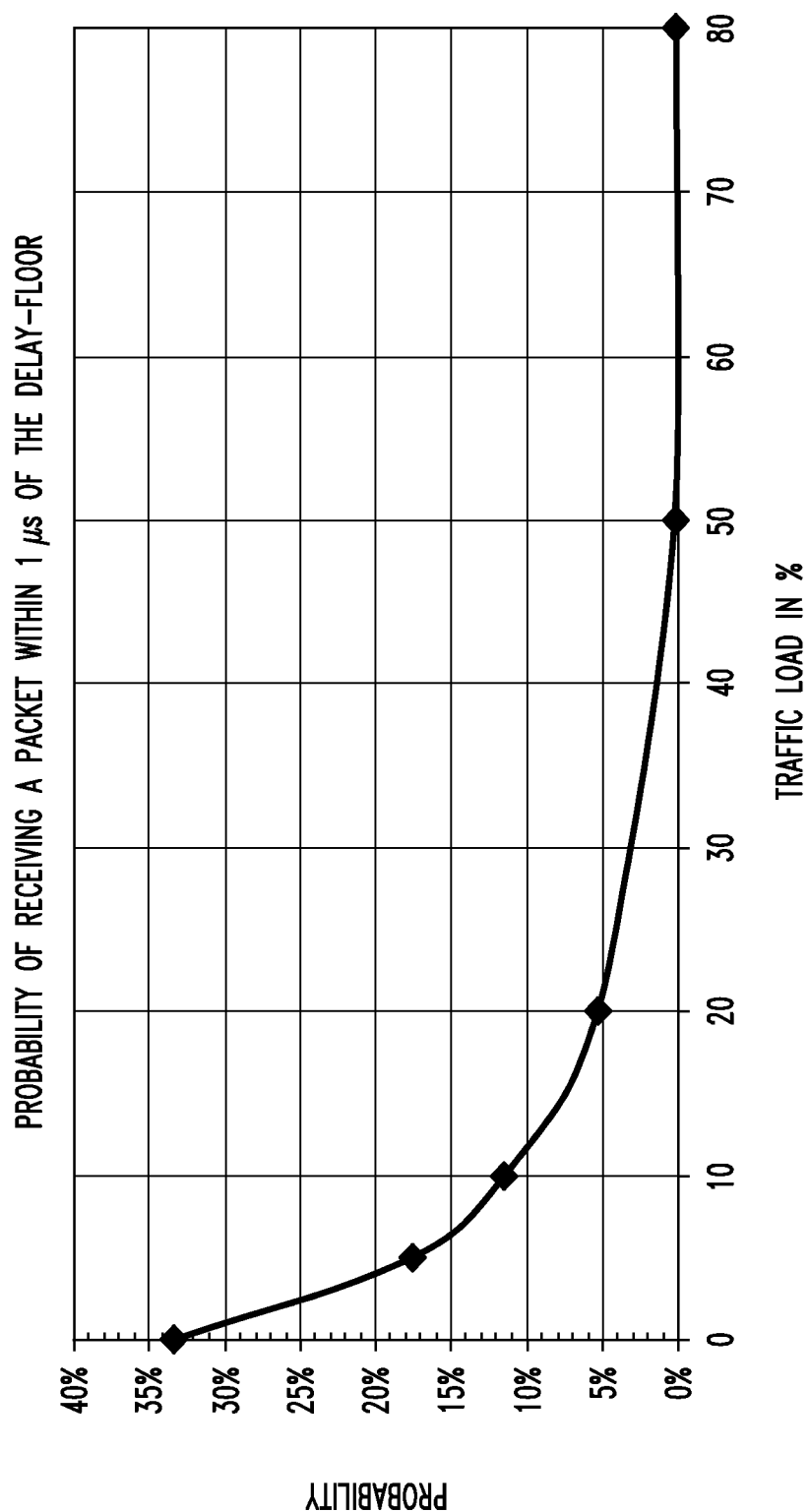
FIG. 8 shows how the probability of receiving a packet with a delay variation of less than 1 microsecond drops significantly as background traffic load increases.

The minimum requirement of many time-based applications is to achieve a time accuracy of ~1 microsecond or less relative to UTC. The plot in FIG. 8, based on the previous ITU-T G.8261 simulation model, shows how the probability of receiving a packet with a delay variation of less than 1 microsecond lowers significantly as background traffic load increases. For adaptive clock recovery (ACR) mechanisms, this low probability means that the time windowing functions used to find the low-delay packets must increase greatly to ensure that a suitable packet within 1 microsecond of the delay floor is received. These delays are further compounded by the relatively low rate of PTP sync messages (typically fewer than 20 per second) as specified by the application-specific PTP profiles.

The need for large statistical windows used by ACR mechanisms places a phase-stability requirement on oscillators used in PTP slaves. Due to the large time intervals between updates, these oscillators must essentially hold a stable phase reference for intervals from tens of seconds to several minutes. In this state, these oscillators employ phase-stabilizing techniques involving the control of temperature and voltage fluctuations. For example, the need for temperature stability can involve the use of costly ovenized oscillators to deliver sufficient phase stability at the PTP slave.

One common technique for the control or measurement of propagation delay is the use a network of peer-to-peer transparent clocks (P2P-TCs) or boundary clocks (BCs) to carry PTP messages. By relying on P2P-TCs to update the correction field of PTP sync messages, the propagation delay of each PTP event message can be measured and used to effectively compensate for any delay or delay variations that these sync messages experience in the PSN. A network of BCs can also be used where the delay request/response mechanism can be used effectively between BCs. Though the use of a network of P2P-TCs or BCs has been shown to be an effective method of compensating for delay and delay variation of PTP event messages, this usage involves a complete build-out of PTP-aware devices in the PSN.

Due to the unknown variation in network delay, the delay request/response mechanism might not be able to be used reliably in a non-PTP-aware network. The high variation in packet delays due to increasing traffic reduces the correlation between the actual propagation delay experienced by the sync message compared with the sampled one-way delay obtained by the delay request/response mechanism. This error is further increased by the asymmetric delay caused by reverse background traffic flows.

On the other hand, the accuracy of the delay request/response mechanism can be dramatically improved if the background traffic load approaches 0%. Since the PTP protocol is based on a system of absolute time measurement, it is possible to use various PTP delay-measurement mechanisms to compute the average one-way delay and determine when low traffic load conditions exist. One characteristic that can be used to describe the PDV is the difference between the mean one-way delay values of a consecutive series of delay measurements compared with the minimum one-way delay of that series. That is to say, for a series of N received consecutive one-way delays $D_1$ to $D_N$, the mean delay value $D_{MEAN}$ is defined as:

$$D_{MEAN} = \frac{1}{N}\sum_{X=1}^{N} D_X.$$

Likewise, the minimum delay $D_{MIN}$ of the same consecutive set is defined as:

$$D_{MIN} = \underset{X=1}{\overset{N}{MIN}} D_X.$$

By taking the difference of these two values, the mean delay offset $Do_M$ of the one-way delays can be computed as:

$$Do_M = D_{MEAN} - D_{MIN}.$$

Thus, the value of $Do_M$ could be used as a metric to determine the level of relative measure of traffic load. To demonstrate how this metric can be used by the PTP selective synchronization process, consider the computed values of $Do_M$ based on the previous ITU-T G.8261 simulation model as shown in Table I. Note the linear and proportional relationship between traffic load and $Do_M$. Although the accuracy of this measurement depends on gathering a significantly large sample size of consecutive packet delays, the data can be gathered while maintaining the PTP slave's local clock with the stable physical-layer syntonizing reference.

TABLE I

Mean delay offset as a function of background traffic load

| Load % | $Do_M$ in µs |
|---|---|
| 0 | 1.118665487 |
| 5 | 2.832925888 |
| 10 | 4.570940347 |
| 20 | 8.016836889 |
| 50 | 18.67312531 |
| 80 | 30.1693796 |

During the time-renewal session, a series of delay request/response measurements could be taken without updating the PTP slave's local clock. The value of $Do_M$ can then be computed using a pre-determined sample size and compared with a pre-defined threshold value. This threshold value can be based on either a user-defined or default value that corresponds with a maximum allowed traffic load as shown in Table I. If the value of $Do_M$ is equal to or lower than this pre-set threshold value, then the PTP slave's local clock is allowed to resynchronize as a part of the time-renewal session. If the value of $Do_M$ is higher than the pre-set threshold value, then the PTP slave's local clock remains unchanged and continues to be updated using the syntonized physical layer.

The mean delay offset $Do_M$ is but one of many possible metrics that could be used to evaluate background traffic load. Regardless of the actual metric and technique used, the overall objective is to determine when low traffic loads exist and allow the PTP slave's local clock to be resynchronized only during those periods. The actual trigger event for a time-renewal session can be initiated either manually (by an operator), as scheduled (to occur at a specific time), or based on periodic measurement algorithm.

Deployment Scenarios

PTP systems using the selective synchronization mode of operation can be deployed in a variety of packet networks with various levels of packet-layer PTP or physical-layer syntonization support. As described previously, FIG. 1 shows one possible implementation of such a PTP system. With reference to system 100 of FIG. 1:

PTP timestamp generator 118 is a timestamp generator that generates a real-time timestamp based on the current master clock time $T_{MC}$ of the master clock 116. Specific examples of master clock 116 used to generate $T_{MC}$ include (without limitation) an IEEE1588 master clock and a Network Time Protocol (NTP) master clock.

Ethernet equipment clock (EEC) 122 is one example of a retiming clock that filters phase noise of incoming syntonized frequency reference $F_{SM}$ generated by syntonized reference 114 and generates a transmit clock frequency $F_T$. Similarly, EEC 150 is a retiming clock that filters phase noise of incoming syntonized frequency reference $F_R$ recovered by SE PHY 142 and generates a syntonized reference frequency F. Other retiming clocks that can be used in alternative PTP selective synchronization systems of the present invention include (without limitation) an ITU-T G.812-type clock and an ITU-T G.813-type clock.

Synchronous Ethernet physical interface (SE PHY) 120 is one example of a syntonizing physical interface that uses transmit clock frequency $F_T$ to syntonize the physical-layer signal of the output Ethernet signal. Similarly, SE PHY 142 is one example of a syntonizing physical interface that recovers the syntonized reference frequency $F_R$ from the received Ethernet signal. Other physical interfaces that can be used in alternative PTP selective synchronization systems of the present invention include (without limitation) a DS1/E1 Line Interface Unit (LIU) and a SONET/SDH LIU.

PTP client 146 is one example of a timestamp processor that receives timestamps from a timestamp generator over the transport network and recovers time- and/or frequency-based timestamp values and/or one-way delay values based on network measurements using timestamps. Specific examples of PTP client 146 include (without limitation) an IEEE1588 client and an NTP client.

Synchronous packet-switched network 130 is one example of a synchronous transport network that transmits timestamped messages from the master to the slave. Other synchronous transport networks that can be used in alternative PTP selective synchronization systems of the present invention include (without limitation) a hybrid network that comprises some PTP elements and some ordinary packet switches.

The list below outlines (without limitation) various possible network-deployment scenarios.

PTP Aware and Synchronous Ethernet Aware

Networks that are aware of both PTP and synchronous Ethernet support various combinations of PTP devices (e.g., BCs and/or TCs) and maintain a synchronous physical connection by embedding the EEC functionality in each of these devices. The EEC source frequency is traceable to UTC. System 100 of FIG. 1 may be implemented as this type of network. An alternative embodiment may allow separation of the EEC and PTP devices in the network. The only requirement for this case is that the source for each of these devices be UTC traceable.

PTP Aware with Alternative Syntonized Physical-Layer Support

These networks support various combinations of PTP devices (e.g., BCs and/or TCs) and maintain a synchronous physical connection by using traditional physical-layer synchronized methods (e.g., SONET/SDH or PDH). The alternative synchronized source frequency is traceable to UTC, which is beyond the plesiochronous requirements of the ITU-T G.811 standard. Therefore, appropriate equipment or network modifications may be necessary to achieve the required phase stability of the end application.

Ordinary Packet Network and Synchronous Ethernet Aware

These networks are not required to be PTP aware and can consist of ordinary packet switches. For best performance, these switches should have interconnection links at a 1 Gbps rate or higher. The synchronized physical-layer frequency is distributed by a series of EEC clocks and might or might not follow the same timing chain as the PTP path. The EEC source frequency is traceable to UTC. System 100 of FIG. 1 may be implemented as this type of network.

Ordinary Packet Network with Alternative Syntonized Physical-Layer Support

These networks are not required to be PTP aware and can consist of ordinary packet switches. For best performance, these switches should have interconnection links at a 1 Gbps rate or higher. The synchronized physical-layer frequency is distributed using traditional physical-layer synchronized methods (e.g., SONET/SDH or PDH). The alternative synchronized source frequency is traceable to UTC, which is beyond the plesiochronous requirements of the ITU-T G.811 standard. Therefore, appropriate equipment or network modifications may be necessary to achieve the required phase stability of the end-user application.

Hybrid Packet Network and Synchronous Ethernet Aware

These networks may include a mix of PTP-aware and non-PTP-aware devices. For best performance, these switches should have interconnection links at a 1 Gbps rate or higher. The synchronized physical-layer frequency is distributed by a series of EEC clocks and might or might not follow the same timing chain as the PTP path. The EEC source frequency is traceable to UTC. System 100 of FIG. 1 may be implemented as this type of network.

Hybrid Packet Network with Alternative Syntonized Physical-Layer Support

These networks may include a mix of PTP-aware and non-PTP-aware devices. For best performance, these switches should have interconnection links at a 1 Gbps rate or higher. The synchronized physical-layer frequency is distributed using traditional physical-layer synchronized methods (e.g., SONET/SDH or PDH). The alternative synchronized source frequency is traceable to UTC, which is beyond the plesiochronous requirements of the ITU-T G.811 standard. Therefore, appropriate equipment or network modifications may be necessary to achieve the required phase stability of the end-user application.

The actual performance of each of these deployment scenarios depends on both the delay characteristics of the packet transport network, PTP transport awareness, and the ability of physical-layer networks to meet the phase and time requirements of the end-user application. For the initial time-setting session of the selective synchronization mode, the convergence time will depend on the actual background traffic load and the resulting PDV on the path between the master and the slave clock.

PTP Selective Synchronization—Summary of Expected Performance and Advantages

Many performance advantages can be realized by using the selective synchronization method according to certain embodiments of the present invention vs. the traditional method in which both IEEE1588 and synchronous Ethernet are fully active. A summary of the various performance characteristics and advantages follows.

Reduced cumulative packet traffic is sent from the master to a PTP slave—The overall cumulative PTP traffic sent between a master or a boundary clock to a slave is significantly reduced. Because any background traffic contributes to the network PDV, lower amounts of background traffic will improve overall network PDV for other types of packet traffic, including circuit emulation-type traffic using adaptive clock recovery methods.

Increased number of PTP slaves synchronized to a single master domain—If the PTP master does not need to have a continuous session with each PTP slave, then more PTP slaves can be associated with a specific master domain. In essence, the number of slaves to a master can be "oversubscribed," thus lowering the number of masters needed to support a population of slaves in a domain vs. the dedicated PTP sessions currently required.

Increased number of available masters for each PTP slave—For certain telecommunications applications, high-availability PTP distribution is required. Various techniques for alternative master selection, in addition to the BMCA, have been specified in the IEEE1588 standard. For masters in a selective synchronization mode of operation, they will have more resources available at any given time than if they were engaged in continuous PTP sessions with dedicated slave clocks. This situation translates into better network coverage when a PTP master for a domain fails. Slaves can then switch to a different master on the same or different domain without transient effects on the local clock.

Achieve 5-nines performance for timescale distribution over packet-based facilities—It is possible to achieve a higher level of performance through the use of the PTP selective synchronization mode because the influence of PDV can be substantially minimized or even eliminated. Between time-renewal sessions, the PTP slave clock uses the out-of-band, but traceable, physical-layer-based syntonization source that is not influenced by PDV. Therefore, the performance and reliability of the slave is directly related to the reliability of the physical-layer syntonization reference, which is typically maintained to a 5-nines (99.999%) availability.

Lower reliance on PDV metrics—At this time, no metrics are available to describe or limit the PDV at a packet interface. As such, there is currently no way to define, qualify, or determine if a PTP session will yield a stable time result at the slave. Because the PTP selective synchronization mode commonly uses a physical-layer-based transport method to control the stability of the slave's local clock, it will not be affected by "high" levels of PDV, un-stable delay floors, or other PDV anomalies. At such time when PDV metrics are available, they can be used to determine the best time to perform a time-renewal session based on the measurement of network PDV between the master and the slave.

Support a secure time transport capability—PTP security issues are based on a variety of issues surrounding the "spoofing" of PTP timestamp-bearing packets by a "man in the middle" attack to a denial-of-service scenario. For traditional PTP systems that rely on a constant stream of PTP packets, the likelihood always exists that the PTP packets received by a PTP slave could be compromised. However, by relying on the syntonized physical layer to maintain slave timing and selectively using the PTP protocol to time-set the PTP slave, the susceptibility of these common cyber attacks can be greatly reduced if not eliminated.

Conclusions

The PTP selective synchronization mode of operation relies on two key concepts that result in the deterministic ability to transport time over packet networks. First, a syntonized physical layer that carries UTC-traceable timing is used to maintain the counting rate of a PTP slave once the local clock is synchronized. By using well-established methods for controlling jitter and wander in the network, common physical-layer transport technologies, including synchronous Ethernet can be used as enabling methods. Second, the ability to deterministically select when a PTP slave node is synchronized is very different from the common way that the protocol is used today. By allowing the synchronization process to occur only during optimum periods of low background traffic, the effects of PDV can be greatly minimized, thus achieving a faster synchronization convergence time. In addition, low background traffic conditions greatly increase the accuracy of the delay request/response mechanism for the measurement of one-way delay between a master and a slave and the compensation of the time offset. These low PDV conditions allow PTP to accurately transport time over common packet networks without the need for on-pass support. Though TCs or BCs can be used with the selective synchronization method, their use might not be mandatory in all cases.

There are many advantages of not sending PTP event messages during periods where the physical layer is used to maintain synchronization. One significant aspect of the orthogonally of the PTP application layer and the physical layer is the ability to tolerate cyber attacks. Relying on the secure aspects of the physical-layer frequency distribution, the PTP selective synchronization mode has the ability to maintain timescale distribution during periods when packet traffic may be compromised.

The concept of using synchronous physical-layer frequency to maintain time clocks has been shown to achieve a very high level of performance under controlled laboratory conditions. See, e.g., P. Moreira, J. Serrano, T. Woostowski, P. Loschmidt, and G. Gaderer, 2010, "White Rabbit: Sub-Nanosecond Timing Distribution over Ethernet," the teachings of which are incorporated herein by reference in their entirety. It is intended that this PTP mode of operation be considered for standardization by a recognized standards body with a defined PTP profile.

Another aspect that needs to be addressed in standards is the definition of a UTC-based frequency and time reference for use as a source of syntonizing and synchronizing signals. This device would ensure that the output frequency reference does not deviate in time or phase relative to UTC. This synchronous relationship also ensures that the long-term phase error between multiple reference devices will not drift in time or phase with respect to each other. This is in contrast to the performance of an ITU-T G.811 clock that is allowed to have up to a maximum phase error of 0.01 ns/sec. Therefore, new or additional specifications will need to be incorporated in ITU-T G.8262, ITU-T G.8264, or other physical layer-based syntonizing methods to support the transfer of time in a PSN.

Alternative Embodiments

The present invention can be implemented in the context of an embodiment in which a slave node establishes, with a master node, an initial time-setting session based on a packet-layer synchronization protocol (e.g., PTP) and employs the packet-layer synchronization protocol during the time-setting session, to correlate slave time at the slave node to master time at the master node. After correlating the slave time to the master time, the slave node terminates the time-setting session and, during a so-called syntonization-only period, the slave node employs a physical-layer syntonization protocol (e.g., synchronous Ethernet) to maintain the slave time. After the syntonization-only period, the slave node establishes a time-renewal session based on the packet-layer synchronization protocol and employs the packet-layer synchronization protocol during the time-renewal session to determine whether to adjust the slave time relative to the master time. Note that, during all three periods of time (i.e., the initial time-setting session, the syntonization-only period, and the subsequent time-renewal session), the slave node continuously employs the physical-layer syntonization protocol.

The present invention is not limited to such a scenario. For example, in one alternative embodiment, after correlating the slave time to the master time during an initial time-setting period, the PTP session between the master node and the slave node is not terminated. In that case, the master node continues to transmit timestamped sync messages to the slave node at the same rate as during the time-setting period, but the slave node chooses to ignore those sync messages and employs only the physical-layer syntonization protocol to maintain the slave time during the syntonization-only period that follows the time-setting period. At some later point in time (e.g., after determining that network traffic load is sufficiently low), the slave node chooses to resume using the sync messages during a time-renewal period to determine whether to adjust the slave time relative to the master time. In this latter scenario, the PTP session is never terminated, and the master node is unaware that the slave node ever stopped using the sync messages during the syntonization-only period.

In addition, during the syntonization-only period in which the PTP session is still active, the slave node could periodically communicate with the master node to take a succession of one-way delay measurements. When the slave node determines that the one-way delay is sufficiently low (indicating low network traffic load), the slave node can initiate a time-renewal period by resuming use of the timestamped sync messages to determine whether to update the slave time.

What both scenarios have in common is an initial time-setting period during which the slave node employs the packet-layer synchronization protocol to correlate slave time at the slave node to master time at the master node, followed by a syntonization-only period during which the slave node employs a physical-layer syntonization protocol but not the packet-layer synchronization protocol to maintain the slave time. During a subsequent time-renewal period, the slave node employs the packet-layer synchronization protocol to determine whether to adjust the slave time relative to the master time. In one scenario, the slave node explicitly terminates the first PTP session with the master node at the end of the initial time-setting period and establishes a second PTP session at the beginning of the subsequent time-renewal period. In the other scenario, a single PTP session is maintained during the entire sequence of events.

Note further that, in both scenarios, during both the initial time-setting period and the subsequent time-renewal period, the slave node uses timestamped sync messages received from the master node, but that, during intervening syntonization-only period, the slave node does not use any timestamped sync messages to maintain its local slave time, independent of whether or not the slave node actually receives such sync messages during the syntonization-only period.

In general, PTP masters can send event messages in two ways: unicast and multicast. A PTP multicast session allows a single generated sync message to be used by multiple slaves. Since these messages arrive at each slave at a slightly different time, the timestamped multicast sync messages alone cannot be used to accurately distribute time information. The only exception to this is if a network of peer-to-peer transparent clocks is used to update the correction field in the multicast sync messages.

A PTP unicast session, on the other hand, supports a unique communication exchange between a master and a slave. Unicast sessions are typically used to send delay request/response messages between a master and a slave to measure the one-way delay between the master and the slave. By knowing the time from the multi-cast sync messages and the one-way delay from the unicast session, the slave's local clock can be accurately synchronized. Generally, for time applications, the master needs to send event messages in both unicast and multicast modes when a transparent clock network is not used.

During a multicast session, the master continues to transmit sync messages regardless of the slave's operational state. Between selective synchronization events, a slave ceases to update the local clock (or timescale) using PTP event messages and relies on the syntonized physical-layer reference to maintain the timescale of the slave's local clock. In this way, the master continues to provide an active PTP session to other slaves in the same timing domain using multicast sync messages. Therefore, the selective synchronization mode only affects the synchronization operation of an individual slave and does not necessarily impact other slaves in the same timing domain or require coordination with the master.

As an alternative embodiment, during the syntonization-only operating state, the master could optionally select not to transmit sync messages or other PTP event messages during this period.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method of coordinating and maintaining timing between a master node and a slave node in a packet network, the method comprising:
    (a) the slave node employing a packet-layer synchronization protocol during a first period, to correlate slave time at the slave node to master time at the master node; and
    (b) the slave node employing a physical-layer syntonization protocol during a second period, following the first period, to maintain the slave time, wherein the slave node does not use the packet-layer synchronization protocol during the second period to maintain the slave time.

2. The method of claim 1, wherein the slave node does not terminate the packet-layer synchronization protocol at the end of the first period after correlating the slave time to the master time such that, during the second period, the packet-layer synchronization protocol is active between the slave node and the master node.

3. The method of claim 1, wherein the slave node terminates the packet-layer synchronization protocol at the end of the first period after correlating the slave time to the master time such that, during the second period, the packet-layer synchronization protocol is not active between the slave node and the master node.

4. The method of claim 1, wherein the packet-layer synchronization protocol and the physical-layer syntonization protocol are traceable to a common reference timescale.

5. The method of claim 1, further comprising:
    (c) the slave node employing the packet-layer synchronization protocol during a third period, following the second period, to determine whether to adjust the slave time relative to the master time.

6. The method of claim 5, wherein, in step (c), the slave node adjusts the slave time if the slave node determines, during the third period, that the slave time differs from the master time by more than a specified threshold level.

7. The method of claim 5, wherein:
    during the first period, the slave node receives timestamped sync messages separated in time by a first duration;
    the second period lasts for a second duration;
    during the third period, the slave node receives timestamped sync messages separated in time by a third duration;
    the first and third durations are both less than or equal to one second; and
    the second duration is greater than one minute.

8. The method of claim 5, wherein, during the third period, the slave node employs the packet-layer synchronization protocol with a different master node from the master node involved in the first period.

9. The method of claim 5, wherein the slave node implements step (c) more than one minute after the slave node implements step (a).

10. The method of claim 5, wherein:
    if the slave node determines that one or more specified network conditions exist, then the slave node implements step (c).

11. The method of claim 10, wherein the one or more specified network conditions comprise network load being below a specified threshold level.

12. The method of claim 1, wherein:
    the packet-layer synchronization protocol and the physical-layer syntonization protocol are traceable to a common reference timescale;
    further comprising:
        (c) the slave node employing the packet-layer synchronization protocol during a third period, following the second period, to determine whether to adjust the slave time relative to the master time;
    in step (c), the slave node adjusts the slave time if the slave node determines, during the third period, that the slave time differs from the master time by more than a specified threshold level;
    during the first period, the slave receives timestamped sync messages separated in time by a first duration;
    the second period lasts for a second duration;
    during the third period, the slave receives timestamped sync messages separated in time by a third duration;
    the first and third durations are both less than or equal to one second; and
    the second duration is greater than one minute.

13. A slave node for a packet network having a master node, the slave node to comprising:
    an interface configured to communicate with the master node; and
    one or more processing elements configured to:
    (a) employ a packet-layer synchronization protocol during a first period, to correlate slave time at the slave node to master time at the master node; and
    (b) employ a physical-layer syntonization protocol during a second period, following the first period, to maintain the slave time, wherein the slave node does not use the packet-layer synchronization protocol during the second period to maintain the slave time.

14. The slave node of claim 13, wherein the slave node does not terminate the packet-layer synchronization protocol at the end of the first period after correlating the slave time to the master time such that, during the second period, the packet-layer synchronization protocol is active between the slave node and the master node.

15. The slave node of claim 13, wherein the slave node terminates the packet-layer synchronization protocol at the end of the first period after correlating the slave time to the master time such that, during the second period, the packet-layer synchronization protocol is not active between the slave node and the master node.

16. The slave node of claim 13, wherein the packet-layer synchronization protocol and the physical-layer syntonization protocol are traceable to a common reference timescale.

17. The slave node of claim 13, wherein the slave node is further configured to:

(c) employ the packet-layer synchronization protocol during a third period, following the second period, to determine whether to adjust the slave time relative to the master time.

18. The slave node of claim 17, wherein:
during the first period, the slave node receives timestamped sync messages separated in time by a first duration;
the second period lasts for a second duration;
during the third period, the slave node receives timestamped sync messages separated in time by a third duration;
the first and third durations are both less than or equal to one second; and
the second duration is greater than one minute.

19. The slave node of claim 17, wherein:
if the slave node determines that network load is below a specified threshold level, then the slave node employs the packet-layer synchronization protocol during the third period to determine whether to adjust the slave time relative to the master time.

20. A packet network comprising a master node and a slave node, wherein the slave node is configured to:
(a) employ a packet-layer synchronization protocol during a first period, to correlate slave time at the slave node to master time at the master node; and
(b) employ a physical-layer syntonization protocol during a second period, following the first period, to maintain the slave time, wherein the slave node does not use the packet-layer synchronization protocol during the second period to maintain the slave time.

* * * * *

UNITED STATES PATENT AND TRADEMARK OFFICE
CERTIFICATE OF CORRECTION

PATENT NO. : 8,446,896 B2
APPLICATION NO. : 12/965969
DATED : May 21, 2013
INVENTOR(S) : P. Stephan Bedrosian Page 1 of 1

It is certified that error appears in the above-identified patent and that said Letters Patent is hereby corrected as shown below:

In the Claims:

- In Column 20, Line 37, please delete "to".

Signed and Sealed this
Sixth Day of August, 2013

Teresa Stanek Rea
*Acting Director of the United States Patent and Trademark Office*